(12) United States Patent
Kato

(10) Patent No.: US 10,748,470 B2
(45) Date of Patent: *Aug. 18, 2020

(54) LEVEL SHIFTER AND PROJECTOR

(71) Applicant: CASIO COMPUTER CO., LTD., Shibuya-ku, Tokyo (JP)

(72) Inventor: Koichi Kato, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 47 days.

This patent is subject to a terminal disclaimer.

(21) Appl. No.: 16/132,141

(22) Filed: Sep. 14, 2018

(65) Prior Publication Data

US 2019/0012953 A1  Jan. 10, 2019

Related U.S. Application Data

(62) Division of application No. 15/046,208, filed on Feb. 17, 2016, now Pat. No. 10,102,791.

(30) Foreign Application Priority Data

Mar. 3, 2015 (JP) ................. 2015-040878

(51) Int. Cl.
  *G06F 1/32* (2019.01)
  *G06F 1/26* (2006.01)
  (Continued)

(52) U.S. Cl.
  CPC ......... *G09G 3/2092* (2013.01); *G06F 1/3218* (2013.01); *G06F 1/3265* (2013.01);
  (Continued)

(58) Field of Classification Search
  None
  See application file for complete search history.

(56) References Cited

U.S. PATENT DOCUMENTS 5,734,914 A   3/1998  Nakamura et al.
6,154,845 A  11/2000  Ilkbahar et al.
(Continued)

FOREIGN PATENT DOCUMENTS

CN       1177857 A    4/1998
CN     101336514 A   12/2008
(Continued)

OTHER PUBLICATIONS

Chinese Office Action dated Apr. 8, 2018 issued in counterpart Chinese Application No. 201610007094.4.

*Primary Examiner* — Tanh Q Nguyen
(74) *Attorney, Agent, or Firm* — Holtz, Holtz & Volek PC

(57) ABSTRACT

A level shifter included in a device includes an external interface power circuit configured to supply a power voltage corresponding to electrical input-output characteristics of an interface circuit of an external device, an internal interface power circuit configured to supply a power voltage corresponding to electrical input-output characteristics of an internal interface circuit in the device, a power switch configured to control power supply to the external interface power unit according to an electrical signal from the external device, and a selector configured to control conduction between the interface circuit of the external device and the internal interface circuit. The selector is configured to transition to an operable state when the external interface power unit is supplied with power.

6 Claims, 2 Drawing Sheets

(51) Int. Cl.
  *G06F 1/00*      (2006.01)
  *G09G 3/20*      (2006.01)
  *G06F 1/3234*    (2019.01)
  *G06F 1/3218*    (2019.01)
  *G09G 3/00*      (2006.01)

(52) U.S. Cl.
  CPC ......... *G09G 3/001* (2013.01); *G09G 2300/04* (2013.01); *G09G 2300/0426* (2013.01)

(56) References Cited

U.S. PATENT DOCUMENTS

| | | |
|---|---|---|
| 7,093,144 B2 | 8/2006 | Skroch |
| 7,249,271 B2 | 7/2007 | Shibata et al. |
| 2010/0013539 A1 | 1/2010 | Novak |

FOREIGN PATENT DOCUMENTS

| | | |
|---|---|---|
| CN | 203225733 U | 10/2013 |
| CN | 104331144 A | 2/2015 |
| CN | 105939157 A | 9/2016 |
| JP | 2000307413 A | 11/2000 |
| JP | 2016167807 A | 9/2016 |

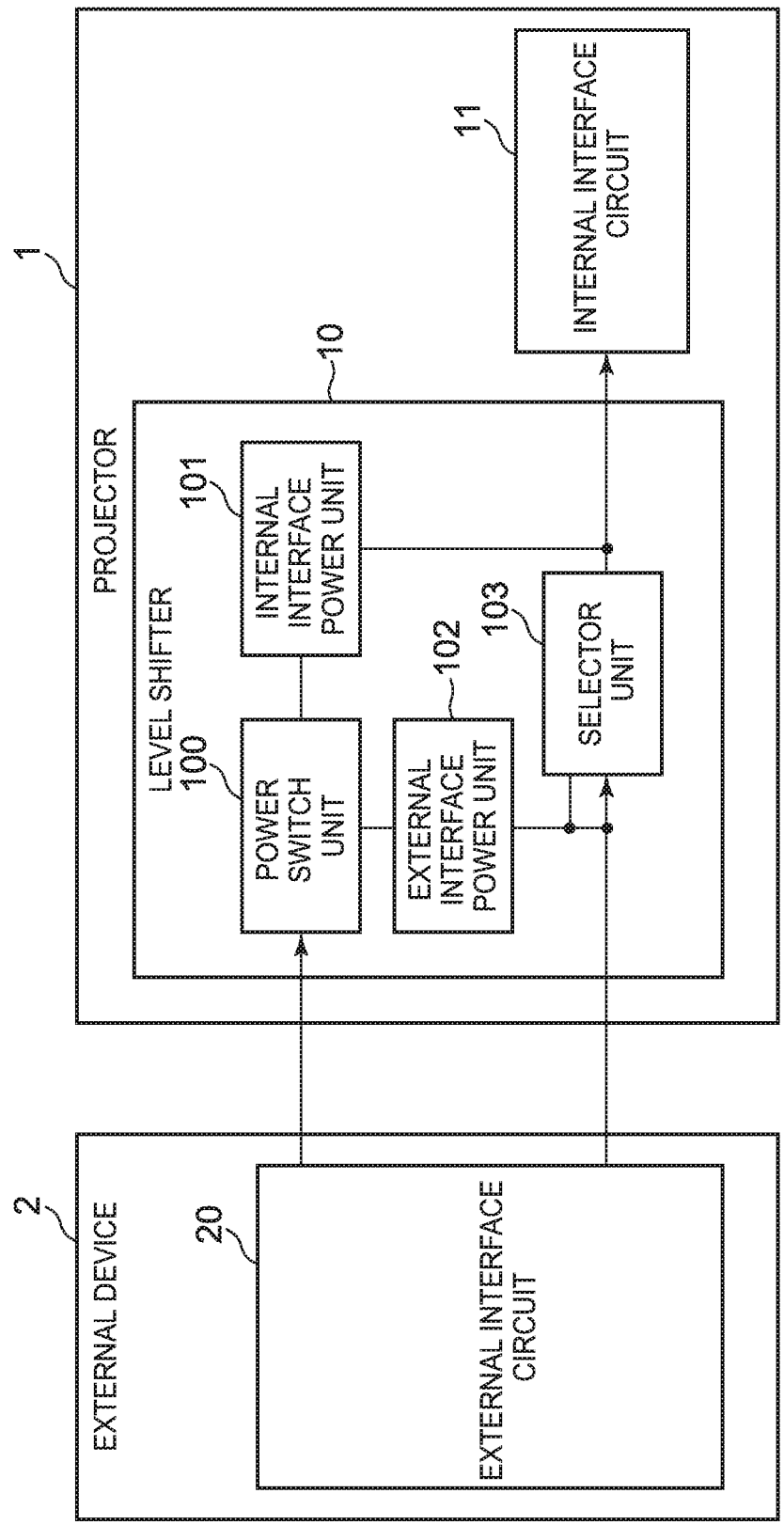

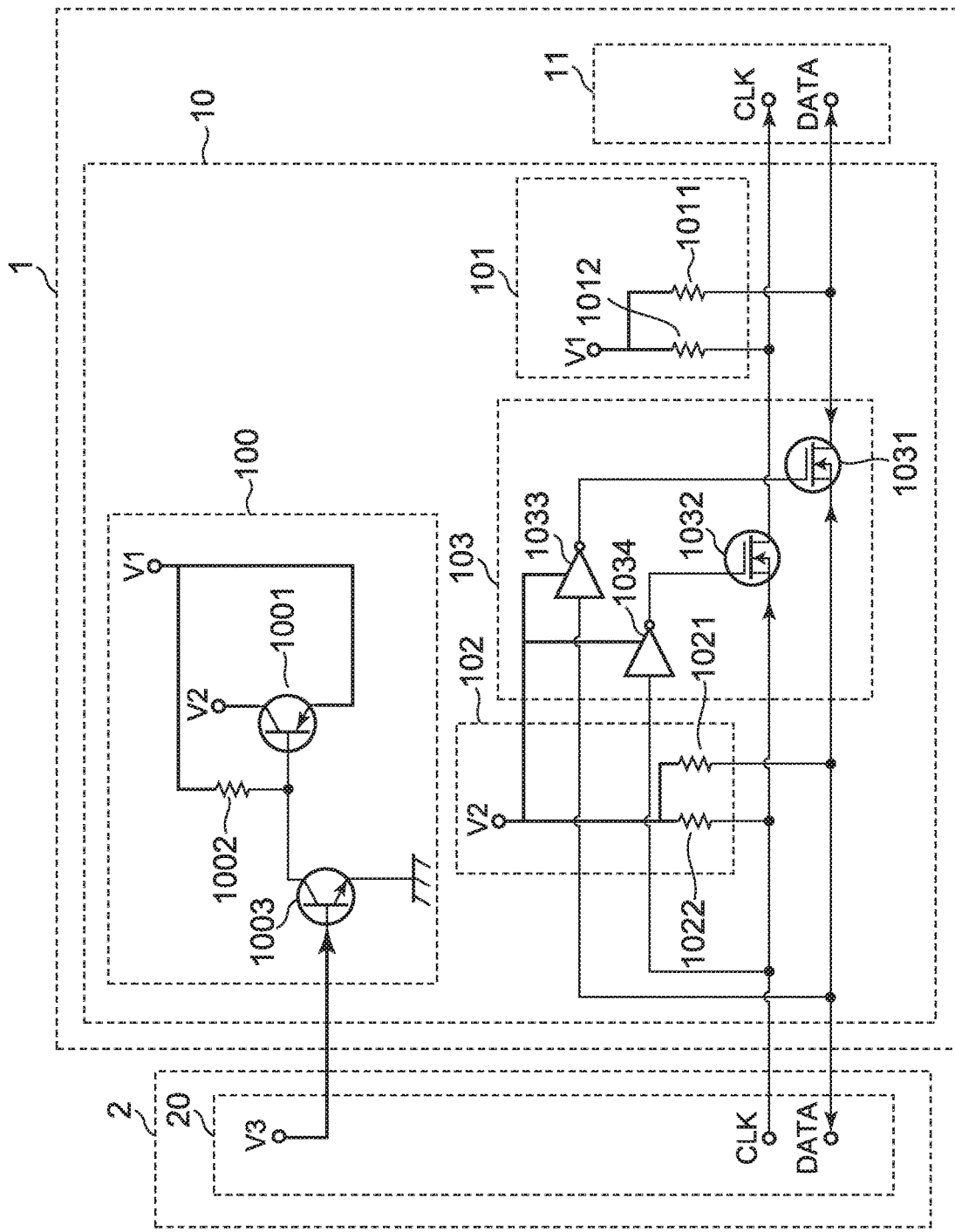

LEVEL SHIFTER AND PROJECTOR

CROSS-REFERENCE TO RELATED APPLICATIONS

This application is a Divisional application of U.S. application Ser. No. 15/046,208, filed Feb. 17, 2016, which is based on and claims priority from Japanese Patent Application Serial No. 2015-040878, filed Mar. 3, 2015. The entire contents of both the above-identified applications are incorporated herein by reference.

BACKGROUND OF THE INVENTION

1. Field of the Invention

The present invention relates to a level shifter and a projector.

2. Description of the Related Art

An example of conventional means for transmitting data such as images from an external device to a projector is an interface (VESA standard) standardized by the Video Electronics Standards Association (VESA®). The use of such means according to the standard enables the projector to receive data such as images from various external devices. Some interfaces standardized by VESA perform bidirectional Extended Display Identification Data (EDID) communication, to establish inter-device connection. The EDID communication is standardized by VESA as the Display Data Channel (DDC). DDC is based on the Inter-Integrated Circuit ($I^2C$) which is a standard serial bus protocol for bidirectional communication employed in various electronic devices. DDC includes Serial Data Line (SDA), Serial Clock Line (SCL), and a +5 V power signal defined in $I^2C$. When a device is connected and power is turned on, +5 V power is supplied and then EDID communication is performed by SDA and SCL according to the DDC specifications.

However, there are also external devices whose interfaces do not comply with the VESA standard in terms of voltage level or power voltage stability. To support such external devices, the projector needs to have a level shifter. For example, Japanese Patent Application Laid-Open No. 2000-307413 discloses a level shifter applicable to open-drain interface lines.

This is effective if the power voltage supplied to the interface circuit of the external device has sufficient stability. If not, however, a problem in that the amplitude of the signal waveform or the maximum value of the signal waveform varies with time arises.

SUMMARY OF THE INVENTION

The present invention provides a level shifter and projector that enable stable inter-device communication without wasting power, by a simple structure.

To achieve the object stated above, the present invention is a level shifter included in a device, the level shifter including: an external interface power unit configured to supply a power voltage corresponding to electrical input-output characteristics of an interface circuit of an external device; an internal interface power unit configured to supply a power voltage corresponding to electrical input-output characteristics of an internal interface circuit in the device; a power switch unit configured to control power supply to the external interface power unit according to an electrical signal from the external device; and a selector unit configured to control conduction between the interface circuit of the external device and the internal interface circuit, wherein the selector unit is configured to transition to an operable state when the external interface power unit is supplied with power.

BRIEF DESCRIPTION OF THE SEVERAL VIEWS OF THE DRAWING

FIG. 1 is a functional block diagram illustrating a projector and a level shifter.

FIG. 2 is a diagram illustrating an example of the structure of the projector and level shifter.

DETAILED DESCRIPTION OF THE INVENTION

The following describes an embodiment of the present invention with reference to drawings.

FIG. 1 is a functional block diagram illustrating a projector and a level shifter.

A projector 1 includes a level shifter 10 and an internal interface circuit 11. The projector 1 is capable of performing data communication with an external interface circuit 20 in an external device 2 by the internal interface circuit 11 via the level shifter 10, and receiving data for inter-device connection from the external device 2. The projector 1 also includes a light source unit, a display element, a light source-side optical system for guiding light from the light source unit to the display element, a projection-side optical system for projecting an image output from the display element onto a screen, projector control means for controlling the light source unit and the display element, and the like, though not illustrated. The projector 1 is accordingly capable of projecting an image, etc. onto the screen or the like, based on data such as an image received from the external device 2.

The level shifter 10 includes a power switch unit 100, an internal interface power unit 101 with sufficiently high power voltage stability, an external interface power unit 102, and a selector unit 103. In the level shifter 10, when an electrical signal (power signal) which is a non-communication signal from an external device is input to the power switch unit 100, power is supplied from the internal interface power unit 101 to the external interface power unit 102 and power is supplied from the external interface power unit 102 to the selector unit 103, enabling data communication between the internal interface circuit 11 and the external interface circuit 20 in an electrical state corresponding to the input-output characteristics of the internal interface circuit 11 and external interface circuit 20.

FIG. 2 is a diagram illustrating an example of the structure of the projector and level shifter.

While a resistor for discharge, a resistor for determining the polarity at power-on, an auxiliary capacitor, a protection diode, etc. are omitted in FIG. 2, these components are desirably added as appropriate in terms of design.

The external interface circuit 20 includes, as interface terminals: a V3 terminal for outputting a power signal V3; a DATA terminal for, as SDA defined in $I^2C$, transmitting a data signal (DATA signal) for inter-device connection by open drain output through a DATA signal line, and receiving a response signal from the internal interface circuit 11 through the DATA signal line; and a CLK terminal for, as SCL defined in $I^2C$, transmitting a clock signal (CLK signal)

for decoding the DATA signal transmitted from the DATA terminal, by open drain output through a CLK signal line.

The internal interface circuit 11 includes: a DATA terminal for receiving the DATA signal transmitted from the external interface circuit 20 through the DATA signal line, and transmitting the response signal to the external interface circuit 20 through the DATA signal line; and a CLK terminal for receiving the CLK signal transmitted from the external interface circuit 20 through the CLK signal line.

The power switch unit 100 includes a transistor 1001, a resistor 1002, and a transistor 1003. The transistor 1001 has a base terminal electrically connected to the collector terminal of the transistor 1003, an emitter terminal electrically connected to an internal interface power V1, and a collector terminal being a supply terminal of an external interface power V2. The resistor 1002 has one end electrically connected to the internal interface power V1, and the other end electrically connected to the base terminal of the transistor 1001. The transistor 1003 has a base terminal electrically connected to the V3 terminal of the external interface circuit 20, an emitter terminal electrically grounded, and a collector terminal electrically connected to the base terminal of the transistor 1001. Thus, when the power signal V3 is input to the transistor 1003 from the external interface circuit 20, the power switch unit 100 supplies the internal interface power V1 as the external interface power V2. Moreover, since a high level voltage is reliably applied to the base terminal of the transistor 1001 in the initial state, the internal interface power V1 is not supplied as the external interface power V2 in the initial state. In other words, when the power signal V3 is input, the power switch unit 100 operates as a switch that permits conduction between the internal interface power V1 and the terminal to which the external interface power V2 is connected.

The internal interface power unit 101 includes resistors 1011 and 1012. The internal interface power unit 101 electrically connects the DATA signal line between a FET 1031 and the internal interface circuit 11 and the internal interface power V1 via the resistor 1011, and electrically connects the CLK signal line between a FET 1032 and the internal interface circuit 11 and the internal interface power V1 via the resistor 1012. This enables the internal interface circuit 11 to appropriately receive each of the CLK signal and DATA signal of high level which are open-drain-output from the external interface circuit 20. This also ensures that the initial input value of the below-mentioned inverter 1033 at power-on is high level.

The external interface power unit 102 includes resistors 1021 and 1022. The external interface power unit 102 electrically connects the DATA signal line between the FET 1031 and the external interface circuit 20 and the external interface power V2 via the resistor 1021, and electrically connects the CLK signal line between the FET 1032 and the external interface circuit 20 and the external interface power V2 via the resistor 1022. This enables the external interface circuit 20 to appropriately receive the response signal of high level which is open-drain-output from the internal interface circuit 11. This also ensures that the initial input value of the below-mentioned inverter 1034 at power-on is high level.

The selector unit 103 includes the FETs 1031 and 1032 and the inverters 1033 and 1034.

The FET 1031 has a gate terminal electrically connected to the output terminal of the inverter 1033, a source terminal electrically connected to the DATA terminal of the external interface circuit 20, and a drain terminal electrically connected to the DATA terminal of the internal interface circuit 11. The FET 1032 has a gate terminal electrically connected to the output terminal of the inverter 1034, a source terminal electrically connected to the CLK terminal of the external interface circuit 20, and a drain terminal electrically connected to the CLK terminal of the internal interface circuit 11.

The inverter 1033 has an input terminal electrically connected to the DATA terminal of the external interface circuit 20, and an output terminal electrically connected to the gate terminal of the FET 1031. The inverter 1034 has an input terminal electrically connected to the CLK terminal of the external interface circuit 20, and an output terminal electrically connected to the gate terminal of the FET 1032.

The following describes the operation in this embodiment.

When the projector 1 and the external device 2 are electrically connected, the power signal V3 of high level with reference to the power voltage in the external interface circuit 20 is output from the V3 terminal of the external interface circuit 20. When the power signal V3 of high level is input to the transistor 1003, current flows from the internal interface power V1 which is a higher power source to the GND via the resistor 1002 and the transistor 1003. As a result, the voltage level applied to the base terminal of the transistor 1001 changes from high level to low level with reference to the internal interface power V1. In other words, a low level signal with reference to the internal interface power V1 is output from the transistor 1003 to the transistor 1001. This causes current to flow from the emitter terminal to collector terminal of the transistor 1001. In detail, the transistor 1001 transitions from a non-conducting state (OFF state) to a conducting state (ON state) between the emitter terminal and the collector terminal. The power voltage of the internal interface power V1 is thus supplied to the external interface power V2.

When the power voltage of the internal interface power V1 is supplied to the external interface power V2, the inverters 1033 and 1034 are supplied with power and become operational. At the same time, the DATA signal line between the FET 1031 and the external interface circuit 20 is pulled up to the external interface power V2 by the resistor 1021, and the CLK signal line between the FET 1032 and the external interface circuit 20 is pulled up to the external interface power V2 by the resistor 1022.

Since the DATA terminal and the CLK terminal as the output terminals of the external interface circuit 20 are each an open drain output, these terminals are in a high impedance state in the connection initial state. As a result of the pullup by the resistor 1021 and the pullup by the resistor 1022, a high level voltage with reference to the external interface power V2 is input to the input terminals of the inverters 1033 and 1034. Hence, a low level voltage with reference to the external interface power V2 is output from the output terminals of the inverters 1033 and 1034.

The low level voltage with reference to the external interface power V2 is then input to the gate terminals of the FETs 1031 and 1032. Here, the FETs 1031 and 1032 are in a state where no drain current flows, that is, in a non-conducting state (OFF state) between the drain terminal and the source terminal. Accordingly, the voltage of the internal interface power V1 is applied to the DATA terminal and CLK terminal of the internal interface circuit 11 respectively via the resistors 1011 and 1012. In other words, a high level voltage with reference to the internal interface power V1 is input to the DATA terminal and CLK terminal of the internal interface circuit 11.

When the DATA terminal and CLK terminal of the external interface circuit 20 perform low level output operation in the state where the projector 1 and the external device 2 are electrically connected, the DATA terminal and the CLK terminal as the output terminals of the external interface circuit 20 are connected to the GND in the external interface circuit 20 as they are each an open drain output. Here, current flows from the external interface power V2 which is a higher power source to the GND in the external interface circuit 20 via the resistors 1021 and 1022. As a result, the voltage level applied to the input terminals of the inverters 1033 and 1034 changes from high level to low level with reference to the external interface power V2. Hence, the high level voltage with reference to the external interface power V2 is output from the output terminals of the inverters 1033 and 1034.

The high level voltage with reference to the external interface power V2 is then input to the gate terminals of the FETs 1031 and 1032. As a result, the FETs 1031 and 1032 transition from an OFF state to a state in which drain current flows, i.e. a conducting state (ON state) between the drain terminal and the source terminal. This causes current to flow from the internal interface power V1 which is a higher power source to the GND in the external interface circuit 20 via the resistor 1011, the FET 1031, and the DATA terminal of the external interface circuit 20, and flow from the internal interface power V1 which is a higher power source to the GND in the external interface circuit 20 via the resistor 1012, the FET 1032, and the CLK terminal of the external interface circuit 20. The low level voltage with reference to the internal interface power V1 is thus input to the DATA terminal and CLK terminal of the internal interface circuit 11.

When the DATA terminal and CLK terminal of the external interface circuit 20 perform high level output operation in the state where the projector 1 and the external device 2 are electrically connected, the DATA terminal and the CLK terminal as the output terminals of the external interface circuit 20 are in a high impedance state during the high level output operation as they are each an open drain output. As a result of the pullup by the resistor 1021 and the pullup by the resistor 1022, the high level voltage with reference to the external interface power V2 is input to the input terminals of the inverters 1033 and 1034. Hence, the low level voltage with reference to the external interface power V2 is output from the output terminals of the inverters 1033 and 1034.

The low level voltage with reference to the external interface power V2 is then input to the gate terminals of the FETs 1031 and 1032. Here, the FETs 1031 and 1032 are in an OFF state. Accordingly, the voltage of the internal interface power V1 is applied to the DATA terminal and CLK terminal of the internal interface circuit 11 respectively via the resistors 1011 and 1012. In other words, the high level voltage with reference to the internal interface power V1 is input to the DATA terminal and CLK terminal of the internal interface circuit 11.

As described above, according to this embodiment, the high level output or low level output from the external interface circuit 20 is input to the internal interface circuit 10 as the low level voltage with reference to the internal interface power V1 or the high level voltage with reference to the internal interface power V1. Therefore, even in the case where the stability of the power voltage supplied to the external interface circuit 20 is insufficient, stable inter-device communication can be realized by a simple structure without the amplitude of the signal waveform or the maximum value of the signal waveform varying with time.

The level shifter 10 in this embodiment includes the external interface power unit 102, the internal interface power unit 101, the power switch unit 100, and the selector unit 103. The selector unit 103 is operable in the case where the external interface power unit 102 is supplied with power by the power switch unit 100.

By making the selector unit 103 operable in the case where the external interface power unit 102 is supplied with power by the power switch unit 100, the power supply to the external interface power unit 102 and selector unit 103 can be interrupted when the external device 2 is not electrically connected. This prevents wasting power. When the external device 2 is electrically connected, stable inter-device communication can be realized by a simple structure without the amplitude of the signal waveform or the maximum value of the signal waveform varying with time, even in the case where the stability of the power voltage supplied to the external interface circuit 20 is insufficient.

The power switch unit 100 in the level shifter 10 in this embodiment includes the transistors 1001 and 1003.

When the external device 2 is not electrically connected, the power switch unit 100 reliably interrupts the power supply to the external interface power unit 102, thus preventing wasting power. When the external device 2 is electrically connected, the power switch unit 100 reliably supplies power to the external interface power unit 102, thus preventing wasting power.

The level shifter 10 in this embodiment includes the internal interface power unit 101, the external interface power unit 102, and the selector unit 103. The selector unit 103 permits conduction between the external interface circuit 20 and the internal interface circuit 11 in the case where the DATA signal from the DATA terminal of the external interface circuit 20 and the CLK signal from the CLK terminal of the external interface circuit 20 are negative in polarity. The selector unit 103 includes: the inverter 1033 that receives the DATA signal from the DATA terminal of the external interface circuit 20, and outputs the electrical signal obtained by inverting the polarity of the DATA signal; the inverter 1034 that receives the CLK signal from the CLK terminal of the external interface circuit 20, and outputs the electrical signal obtained by inverting the polarity of the CLK signal; the FET 1031 that is connected to the inverter 1033, and permits conduction between the external interface circuit 20 and the internal interface circuit 11 according to the electrical signal output from the inverter 1033; and the FET 1032 that is connected to the inverter 1034, and permits conduction between the external interface circuit 20 and the internal interface circuit 11 according to the electrical signal output from the inverter 1034.

The high level output or low level output from the external interface circuit 20 is thus input to the internal interface circuit 11 as the low level voltage with reference to the internal interface power V1 or the high level voltage with reference to the internal interface power V1. Therefore, even in the case where the stability of the power voltage supplied to the external interface circuit 20 is insufficient, stable inter-device communication can be realized by a simple structure without the amplitude of the signal waveform or the maximum value of the signal waveform varying with time.

The projector 1 in this embodiment includes the level shifter 10.

When the external device 2 is not electrically connected, the power switch unit 100 reliably interrupts the power supply to the external interface power unit 102, thus preventing wasting power. When the external device 2 is electrically connected, the power switch unit 100 reliably supplies power to the external interface power unit 102, thus preventing wasting power.

Moreover, the high level output or low level output from the external interface circuit 20 is input to the internal interface circuit 11 as the low level voltage with reference to the internal interface power V1 or the high level voltage with reference to the internal interface power V1. Therefore, even in the case where the stability of the power voltage supplied to the external interface circuit 20 is insufficient, stable inter-device communication can be realized by a simple structure without the amplitude of the signal waveform or the maximum value of the signal waveform varying with time.

The present invention is not limited to the foregoing embodiment, and may be subject to various changes.

For example, although the transistors 1001 and 1003 are bipolar transistors in the foregoing embodiment, this is not a limitation. Any component capable of operating as a switch according to the input of the power signal V3, such as a field effect transistor (FET) or a load switch, may be used. Moreover, as long as the power switch unit 100 operates as a switch that permits conduction between the internal interface power V1 and the terminal to which the external interface power V2 is connected when the power signal V3 is input, the transistors 1001 and 1003 may be NPN type and PNP type respectively, the polarity of the response to the power signal V3 may be inverted, and the number of stages of transistors in the power switch unit 100 may be changed.

Although the FETs 1031 and 1032 are used in the foregoing embodiment, this is not a limitation. Any component capable of operating as a switch according to the output of the inverter 1033 or 1034, such as a bipolar transistor or a load switch, may be used. Moreover, as long as the selector unit 103 operates as a switch that permits conduction between the external interface circuit 20 and the internal interface circuit 10 according to the signal from the DATA terminal or CLK terminal of the external interface circuit 20, the FETs 1031 and 1032 may be P type, the polarity of the response to the signal from the DATA terminal or the CLK terminal may be inverted, and the number of stages of inverters or FETs in the selector unit 103 may be changed.

Although the level shifter 10 is applied to an interface in EDID communication in the foregoing embodiment, this is not a limitation. The level shifter 10 may be applied to an interface of other communication involving open drain output.

The specific structures, processes, and procedures described in the foregoing embodiment may be modified as appropriate without departing from the scope of the present invention.

Although some embodiments of the present invention have been described above, the present invention is not limited to these embodiments but includes the scope of the invention defined in the claims and its equivalent scope.

What is claimed is:

1. A level shifter included in a device, the level shifter comprising:
    an external interface power circuit which supplies a power voltage corresponding to electrical input-output characteristics of an interface circuit of an external device;
    an internal interface power circuit which supplies a power voltage corresponding to electrical input-output characteristics of an internal interface circuit in the device;
    a power switch which controls power supply to the external interface power circuit according to a first electrical signal from the external device; and
    a selector which controls conduction between the interface circuit of the external device and the internal interface circuit,
    wherein the selector comprises:
        an inverter which receives a second electrical signal from the interface circuit of the external device, and outputs a third electrical signal by inverting a polarity of the received second electrical signal; and
        a transistor which is electrically connected to the inverter, and permits conduction between the interface circuit of the external device and the internal interface circuit according to the third electrical signal output from the inverter, and
    wherein the selector is configured to:
        transition to an operable state when the external interface power circuit is supplied with power, and
        permit the conduction between the interface circuit of the external device and the internal interface circuit when the second electrical signal from the interface circuit of the external device is negative in polarity.

2. The level shifter according to claim 1, wherein the power switch includes a group of transistors which supply power to the external interface power circuit according to the first electrical signal.

3. The level shifter according to claim 2, wherein the group of transistors comprise:
    a first transistor that receives the first electrical signal, and outputs a fourth electrical signal according to a polarity of the received first electrical signal; and
    a second transistor that is electrically connected to the first transistor, and supplies power to the external interface power circuit according to the fourth electrical signal output from the first transistor.

4. A projector comprising the level shifter according to claim 1, wherein the projector is the device.

5. A projector comprising the level shifter according to claim 2, wherein the projector is the device.

6. A projector comprising the level shifter according to claim 3, wherein the projector is the device.

* * * * *